United States Patent Office 3,466,176
Patented Sept. 9, 1969

3,466,176
MANUFACTURE OF SYNTHETIC BREAD FLAVOR
Robert H. Bundus, Evanston, and Anthony J. Luksas, Chicago, Ill., assignors to Beatrice Foods Co., Chicago, Ill., a corporation of Delaware
No Drawing. Continuation-in-part of application Ser. No. 567,371, July 25, 1966. This application Dec. 20, 1967, Ser. No. 691,985
Int. Cl. A21d *2/00;* A23l *1/22*
U.S. Cl. 99—140 7 Claims

ABSTRACT OF THE DISCLOSURE

Synthetic bread flavor is produced by a high temperature, short time treatment of whey followed by growing yeast on the whey in the presence of lactic acid. A strong yeasty odor is imparted to the product by either (1) hydrolyzing whey with a lactase, fermenting the product with yeast and then adding the product to synthetic bread flavor, (2) growing lactose fermenting yeast on whey and combining the product with synthetic bread flavor, (3) forming the synthetic bread flavor in the presence of yeast which ferments lactose, or (4) forming the synthetic bread flavor in the presence of lactose fermenting bacteria.

This application is a continuation-in-part of application 567,371, filed July 25, 1966.

The present invention relates to an improvement in the manufacture of bread.

The bread industry is continually shortening the time in the process of manufacturing bread. Unfortunately, however, much of the bread flavor is lost as a result of the shortening of time. Also bread made by the use of chemical leavening agents does not have the desired bread flavor.

Accordingly it is an object of the present invention to impart bread flavor to bread which would otherwise be deficient in such flavor.

Another object is to develop a method of artificially imparting bread flavor in the bread making operation.

An additional object is to prepare bread flavor which does not require the manufacture of bread.

A further object is to prepare a dry bread flavor which can be distributed as such and which can be added to the ingredients employed in the manufacture of bread or can be otherwise employed to impart a bread flavor to food.

Yet another object is to increase the strength of artificially or naturally produced bread flavor.

A still further object is to intensify the desired odor in artificial or natural bread flavor.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by growing a culture of yeast in whey. For best results there is employed a mixture of yeast with nontoxic bacteria of the coccus family, more specifically enterococcus of serological group D and Streptococci of group N, and Lactobacilli. It has been found that a synergistic effect occurs by use of this specific combination of organism whereby there is a greatly enhanced production of bread flavor over that obtained by yeast alone. The enterococcus alone does not develop significant bread flavor when cultured on whey.

As the yeast there can be used, for example, Saccharomyces, such as *Saccharomyces cerevisiae* (bakers' yeast), or any yeast that can be grown on lactic acid or a lactate.

A useful combination of yeast and enterococcus serological group D occur together in a commercial product called Citron.

Whey as is recognized in the art is a by-product in the manufacture of cheese such as cottage cheese, cheddar cheese, Swiss cheese, Neufchatel cheese and cream cheese, for example. Whey contains lactalbumin, casein fines, lactose and lactoglobulin. The preferred whey is cottage cheese whey.

For the best development of the bread flavor the whey should have a high heat treatment. Thus there can be used 180° F. for 20–30 minutes (a maximum time of 45 minutes can be used at 180° F.), 245° F. for 15 minutes, 300° F. for 30 seconds and 310° F. for 15 seconds (as little as 1 second can be used). However, conventional pasteurization conditions, e.g. 145° F. for 30 minutes or 161° F. for 15 seconds are not suitable since without the high heat treatment specified above yeast growth is slow and other organisms can take over the growth.

The protein nitrogen content of the whey can be enhanced by the use of nitrogen sources such as ammonium nitrate, potassium nitrate, sodium nitrate or ammonium phosphate. Preferably diammonium phosphate is added to the whey culture because it gives better growth. Usually 0.1 mole of diammonium phosphate is used per liter of whey but this can be increased or decreased if desired, e.g., there can be used 0.2 mole/liter or 0.01 mole/liter.

The whey culture medium preferably has 6 to 40% total solids. As the solids increase from 30 up to 40% the growth activities of the yeast, or yeast coccus organisms, decrease rapidly terminating in no growth.

It is essential that the lactate group $$(CH_3CHOHCOO—),$$

be present for the yeast to grow and give the desired bread flavor. The lactic acid producing organism digests the lactose in the whey which the yeast cannot use, converting it to lactic acid which the yeast does use. It has further been found that lactic acid can be introduced into the whey during the yeast growth period rather than the lactic acid producing organisms such as Lactobacilli. The lactic acid can be introduced for example as sauerkraut waste which also controls the pH. The lactic acid can be introduced in pure form to give a pH of 3.0 to 4.5, for example, or there can be added non-toxic lactates, e.g. sodium lactate (pH 5.2 to 5.4) or potassium lactate. Preferably the pH is adjusted to about that normally occurring in whey, i.e. 4.3 to 4.5.

The yeast or yeast coccus inoculated whey culture is intimately mixed with a large quantity of air. The air is mixed into the system in any conventional fashion, e.g., with a high speed impeller. Air is bubbled through the culture throughout the growth period. Preferably growth is continued for 14 to 18 hours at 86° F. although shorter times, e.g., 10 to 12 hours can be employed or longer times, e.g., 24 hours.

Usually by the end of the growth stage 5% of the volume of the product is yeast.

The oxygen content of the substrate at the initiation of the yeast growth cycle is high, e.g., 150 to 160 p.p.m. This is allowed to drop and can ultimately go to zero. At this point there is no further yeast reproduction. It is important that the oxygen content be allowed to go down since the bread flavor is produced only during the period of reduced oxygen content. Generally there is little reduction in oxygen content during the first 4 hours because air is being introduced into the medium. During the fifth hour the oxygen content begins to go down drastically since the yeast reproduce so rapidly that the oxygen demand cannot be met and the oxygen drops at an accelerating rate to zero. As stated, it is in this period that the bread flavor is produced.

The process can be carried out continuously by centrifuging the substrate containing yeast when the oxygen content has gone partially down and removing sufficient yeast cells so as to retain the active growth in the yeast cells to use up the lactic acid present.

The product which has developed the bread flavor can be dried directly. However, if it contains over 50% water by weight it has been found desirable to concentrate it to 50% or less volume, e.g., 30% or 40% to improve drying efficiency. This concentration is preferably carried out at 112 to 130° F. in a vacuum. The product can then be spray dried. Alternatively the product is cooled to 110° F. seeded with α-lactose, e.g., of 300 mesh (Tyler series) in an amount of 0.05% by weight and cooled to 70° F. or lower to force crystallization. The concentrate including the crystals is then spray dried at 80° F. The seeding with the α-lactose gives better drying characteristics as well as improved color and solubility.

The dried product is then normally hydrated at the time it is to be used as a flavor supplement in yeast raised doughs or as a flavor additive in chemically leavened doughs, e.g., refrigerator doughs or dry biscuit mixes. When chemically leavened doughs are employed the bread flavor is supplied entirely by the bread flavor additive of the present invention.

The yeast containing bread flavoring additive can be added to the bread dough in an amount of 0.5% up to 15% of the flour. 6% of the flavoring agent based on the flour appears to be optimum.

Unless otherwise indicated, all parts and percentages are by weight.

The bread flavor additive can be added to bread of various types, e.g., white bread, rye bread, biscuits, rolls, whole wheat bread, raisin bread, bagels. It can also be employed to impart a bread flavor to non-bread foods, e.g., to rice stuffing for turkeys and other fowl, dips made from cheese or sour cream, etc.

Example 1

A large batch (300 liters) of cottage cheese whey having 16% total solids was pasteurized at 180° F. for 30 minutes and then inoculated with the yeast-enterococcus (serological group D) mixture described above and vigorously aerated in a 100 gal. vat with a Cowles dissolver for 18 hours at 85° F. The resultant product was very strong in bread flavor and the product was spray dried to a powder. When the powder was used as a flavor source in chemically leavened bread it yielded bread possessing a yeast-raised flavor.

Example 2

The procedure of Example 1 was repeated but there was added 30 moles of diammonium phosphate to the whey prior to adding the yeast-enterococcus culture. The yield of the spray dried bread flavor was increased substantially.

Example 3

The procedure of Example 1 was repeated by adding *Saccharomyces cerevisiae* without the enterococcus to the the culture medium. There was a reduced bread flavor in the spray dried product although it was still significant.

Example 4

2 cups of scalded milk was cooled until it was lukewarm. Then there was added 1 cake of compressed yeast, 3 cups of flour, 1 tablespoon of salt, 2 tablespoons of sugar, 2 tablespoons of vegetable shortening and ⅓ cup of the spray dried bread flavor produced in Example 1. The mixture was heated and then 3 more cups of flour were added gradually. The batter was then tossed on a floured board and kneaded until smooth and elastic. It was put in a bowl and allowed to rise to double its height at 80° F., cut and allowed to double in height again and then baked for 45 minutes at 350° F. to finish the making of the bread having an excellent bread flavor.

Example 5

There were stifted together 2 cups of flour, ¼ cup of sugar, 3 teaspoons of baking powder, ½ teaspoon of salt, ¼ cup of vegetable shortening and 2 tablespoons of the spray dried bread flavor of Example 1. There was then added 1 egg and 1 cup milk and the ingredients thoroughly mixed with an electric blender. The mixture was then poured into greased muffin cups until they were ⅔ full and baked for 25 minutes at 400° F. to produce muffins having a bread flavor.

Example 6

There were mixed together 2¼ cups of lukewarm scalded milk, 4 tablespoons of butter, 2 tablespoons of sugar, 1 egg, 1 teaspoon of salt, 5½ cups of self-rising flour and ⅓ cup of the spray dried bread flavor of Example 1. After thorough mixing the dough was shaped into rolls and baked for 20 minutes at 375° F. to produce finished rolls having a good bread flavor.

Example 7

Cottage cheese whey having 16% solids was sterilized at 300° F. for 20 seconds, cooled to room temperature and lactic acid introduced to give a pH of 4.1. *Saccharomyces cerevisiae* was added and the mixture vigorously aerated at first and then the yeast allowed to grow for 18 hours. The resultant product had a strong bread flavor. It was spray dried to a powder.

As has been pointed out supra, the product of the present invention induces a very pleasant bread-like character in dough in which no yeast fermentation, or insufficient yeast fermentation took place, and plenty of flavor is produced. This flavor manifests itself in the mixing of the dough as a true yeast ferment but after the loaf of bread is baked only the flavor remains but not the odor.

Several different techniques can be employed with the bread flavor to increase the desired odor. Thus the lactose in whey can be hydrolyzed with a lactose enzyme, e.g. β-galactocidase, to split the lactose to galactose and glucose and then the yeast is introduced. Alternatively glucose and/or galactose can be employed as a growth medium for yeast. The product can then be blended with the synthetic bread flavor to intensify the odor.

Example 8

β-galactocidase was added to cottage cheese whey to split the lactose into glucose and galactose at room temperature. After the glucose and galactose were formed *Saccharomyces cerevisiae* was added and allowed to ferment for 24 hours at room temperature. A very intense yeasty odor was produced. This was blended 1:1 with the ferment of bread flavor produced in Example 1 (prior to spray drying). The product was useful as such and also could be spray dried, roller dried, etc.

The yeast ferment and the bread flavor can be spray (or otherwise) dried together or alternatively they can be spray (or otherwise) dried separately and then blended together.

Another method of increasing the odor of the synthetic bread flavor is illustrated in Example 9.

Example 9

Lactose fermenting yeast, specifically *Saccharomyces fragils,* was grown on cottage cheese whey at room temperature to obtain a very intense yeasty odor. The product was spray dried and combined with the spray dried powder of Example 1 in a 1:1 ratio to produce a synthetic bread flavor with a strong yeasty odor.

If desired, the yeast fermentation product of this example can be combined with the synthetic bread flavor prior to spray drying. *Saccharomyces lactis* and other lactose fermenting yeast can be employed in place of *Saccharomyces fragils.*

Example 10

Another method of obtaining a product with an intensified yeasty odor is to repeat Example 1 but adding *Saccharomyces fragils* (or other yeast which ferments lactose) along with the *Saccharomyces cerevisiae.*

Example 11

A still other procedure for preparing a synthetic bread flavor with an intensified yeasty odor is to permit the bread flavor producing organism, e.g., *Saccharomyces cerevisiae* to grow on the whey along with a lactose fermenting bacteria such as *Streptococcus lactis* or *Lactobacillus casei.* Thus in a specific illustration cottage cheese whey having 16% total solids was sterilized at 180° F. for 20 minutes and then there was added *Saccharomyces cerevisiae* and *Streptococcus lactis.* The mixture aerated and the yeast and *Streptococcus lactis* allowed to grow for 18 hours and the product then spray dried.

What is claimed is:

1. In a process of producing a synthetic bread flavor product by growing yeast on a medium consisting essentially of whey and in the presence of lactic acid wherein the whey medium has from 6% to 40% total solids therein and during the growth period the whey medium is intimately mixed with air throughout the growth period of from 14 to 24 hours at above room temperature, the improvement comprising heating the whey at a temperature of from 180° F. for 20 to 45 minutes to a temperature of 310° F. for 1 to 15 seconds prior to growing the yeast.

2. A process according to claim 1 wherein a yeasty odor is imparted to the product by adding to the synthetic bread flavor product an effective amount of the material obtained by hydrolyzing whey with lactase and fermenting the hydrolyzate with yeast.

3. A process according to claim 1 wherein a yeasty odor is imparted to the product by adding to the synthetic bread flavor product an effective amount of the material obtained by growing lactose fermenting yeast on whey.

4. A process according to claim 1 wherein a yeasty odor is imparted to the product by forming the synthetic bread flavor in the presence of yeast or bacteria which ferment lactose.

5. In a process of producing a synthetic bread flavor product by growing yeast on a medium consisting essentially of whey and in the presence of lactic acid wherein the whey medium has from 6% to 40% total solids therein and during the growth period the whey medium is intimately mixed with air throughout the growth period of from 14 to 24 hours at above room temperature, the improvement comprising carrying out the process in the presence of yeast or bacteria which ferment lactose whereby a strong yeasty flavor is imparted to the product.

6. A process of imparting a strong yeasty flavor to a synthetic bread flavor product obtained by growing yeast on a medium consisting essentially of whey and in the presence of lactic acid wherein the whey medium has from 6% to 40% total solids therein and during the growth period the whey medium is intimately mixed with air throughout the growth period of from 14 to 24 hours at above room temperature, comprising adding to said product an effective amount of the material obtained by hydrolyzing whey with lactase and fermenting the hydrolyzate with yeast whereby a strong yeasty flavor is imparted to the product.

7. A process of imparting a strong yeasty flavor to a synthetic bread flavor product obtained by growing yeast on a medium consisting essentially of whey and in the presence of lactic acid wherein the whey medium has from 6% to 40% total solids therein and during the growth period the whey medium is intimately mixed with air throughout the growth period of from 14 to 24 hours at above room temperature, comprising adding to said product an effective amount of the material obtained by growing lactose fermenting yeast on whey.

References Cited

UNITED STATES PATENTS

| | | | |
|---|---|---|---|
| 2,465,870 | 3/1949 | Hanson et al. | 195—82 |
| 2,762,749 | 9/1956 | Myers et al. | 195—82 XR |
| 3,102,033 | 8/1963 | Jackel | 99—90 |

RAYMOND N. JONES, Primary Examiner

J. R. HOFFMAN, Assistant Examiner

U.S. Cl. X.R.

99—90